(12) United States Patent  (10) Patent No.: US 7,056,119 B2
Cabato et al.  (45) Date of Patent: Jun. 6, 2006

(54) PERISCOPIC OPTICAL TRAINING SYSTEM FOR OPERATORS OF VEHICLES

(75) Inventors: Alvin B. Cabato, Plymouth Meeting, PA (US); David Warner, Devon, PA (US); Dale R. Tyczka, Skippack, PA (US); John G. Lehman, Jr., King of Prussia, PA (US)

(73) Assignee: LSA, Inc., Arlington, VA (US)

( * ) Notice: Subject to any disclaimer, the term of this patent is extended or adjusted under 35 U.S.C. 154(b) by 511 days.

(21) Appl. No.: 10/304,952

(22) Filed: Nov. 27, 2002

(65) Prior Publication Data

US 2003/0129567 A1 Jul. 10, 2003

Related U.S. Application Data

(60) Provisional application No. 60/333,754, filed on Nov. 29, 2001.

(51) Int. Cl.
 *G09B 9/00* (2006.01)
 *G09B 9/08* (2006.01)
 *G09B 19/16* (2006.01)

(52) U.S. Cl. .............................. 434/38; 434/69; 345/7; 348/586; 356/145

(58) Field of Classification Search ............... 434/21, 434/29, 30, 38, 43, 44, 69, 365; 463/33, 463/51; 348/36, 51, 115, 586; 345/7, 22, 345/628; 359/13, 631, 832; 352/69; 89/41.06; 353/28, 94, 98, 10; 356/145, 318; 385/116; 369/44.12; 250/236
See application file for complete search history.

(56) References Cited

U.S. PATENT DOCUMENTS

| | | | | |
|---|---|---|---|---|
| 3,746,782 A * | 7/1973 | Driskell | .................. | 348/586 |
| 3,807,849 A * | 4/1974 | Lobb | .................. | 353/98 |
| 3,824,019 A * | 7/1974 | Stalfors | .................. | 356/145 |
| 3,895,861 A * | 7/1975 | Herndon | .................. | 352/69 |
| 3,915,548 A * | 10/1975 | Opittek et al. | .................. | 345/7 |
| 3,915,561 A * | 10/1975 | Toy | .................. | 359/832 |
| 3,990,778 A * | 11/1976 | Magee et al. | .................. | 385/116 |
| 3,992,718 A * | 11/1976 | Driskell | .................. | 348/36 |
| 4,001,499 A * | 1/1977 | Dowell | .................. | 348/115 |
| 4,033,677 A | 7/1977 | Tausch | | |
| 4,065,206 A | 12/1977 | Tausch | | |
| 4,110,011 A | 8/1978 | Tausch | | |
| 4,149,778 A | 4/1979 | Tausch | | |
| 4,189,145 A * | 2/1980 | Stubben et al. | .................. | 463/33 |
| 4,218,111 A * | 8/1980 | Withrington et al. | .................. | 359/13 |
| 4,322,726 A * | 3/1982 | Collier et al. | .................. | 345/7 |
| 4,427,977 A * | 1/1984 | Carollo et al. | .................. | 345/22 |
| 4,464,974 A * | 8/1984 | Goda | .................. | 89/41.06 |
| 4,492,442 A * | 1/1985 | Gaudyn | .................. | 353/10 |
| 4,641,255 A * | 2/1987 | Hohmann | .................. | 345/628 |
| 4,797,868 A * | 1/1989 | Ando | .................. | 369/44.12 |

(Continued)

*Primary Examiner*—Joe H. Cheng
(74) *Attorney, Agent, or Firm*—Reed Smith LLP; Stanley P. Fisher, Esq.; Juan Carlos A. Marquez, Esq.

(57) ABSTRACT

A periscopic optical training system for displaying simulation and real images includes a microprocessor for generating at least one simulation image, at least one display for displaying the simulation image, at least one periscopic device each with a viewing window for receiving the simulation and real images, and a controller for controlling the simulation and real images to be received by the periscopic device interchangeably or simultaneously.

21 Claims, 15 Drawing Sheets

U.S. PATENT DOCUMENTS

| | | | |
|---|---|---|---|
| 5,134,521 A * | 7/1992 | Lacroix et al. | 359/631 |
| 5,213,335 A * | 5/1993 | Dote et al. | 463/51 |
| 5,240,416 A * | 8/1993 | Bennington | 434/30 |
| 5,321,259 A * | 6/1994 | Morgan | 250/236 |
| 5,566,370 A * | 10/1996 | Young | 348/36 |
| 5,572,229 A | 11/1996 | Fisher | |
| 5,805,120 A * | 9/1998 | Yamada et al. | 345/7 |
| 5,890,787 A * | 4/1999 | McNelley et al. | 353/28 |
| 5,908,300 A | 6/1999 | Walker et al. | |
| 5,980,044 A | 11/1999 | Cannon et al. | |
| 6,034,739 A | 3/2000 | Rohlfing et al. | |
| 6,042,238 A * | 3/2000 | Blackham et al. | 353/94 |
| 6,052,125 A | 4/2000 | Gardiner et al. | |
| 6,118,414 A * | 9/2000 | Kintz | 345/7 |
| 6,128,019 A | 10/2000 | Crocker, III et al. | |
| 6,151,060 A * | 11/2000 | Tabata | 348/51 |
| 6,377,344 B1 * | 4/2002 | Schoeppe | 356/318 |
| 6,424,737 B1 | 7/2002 | Rising, III | |
| 6,437,789 B1 | 8/2002 | Tidwell et al. | |
| 6,654,171 B1 * | 11/2003 | Hampel-Vogedes | 359/618 |
| 6,669,346 B1 * | 12/2003 | Metcalf | 353/94 |
| 2004/0076928 A1 * | 4/2004 | Renntoft | 434/21 |

* cited by examiner

PERISCOPIC OPTICAL TRAINING SYSTEM FOR OPERATORS OF VEHICLES

This application claims the benefit of U.S. Provisional Patent Application Ser. No. 60/333,754 filed on Nov. 29, 2001, the entire disclosures of which are incorporated herein by reference.

BACKGROUND OF THE INVENTION

1. Field of the Invention

The invention generally relates to a periscopic optical training system which displays simulation and real images, and a method for using the same. More particularly, it relates to an augmenting electro-optical periscopic in situ training system including an improved periscope and a computation-driven display which shows simulation and real images interchangeably or simultaneously.

2. Description of Related Arts

Proper training is essential for military forces around the world for teaching basic skills to new personnel and sustaining demanding skills that can degrade without practice. Different training methods have been employed in the form of various algorithms to synthesize real world scenario simulations, so that the trainee can have multiple experiences without risk to life, limb, or equipment. Some of the training equipment are disclosed in U.S. Pat. No. 5,908,300, which teaches a hang gliding simulation system with a stereoscopic display, and U.S. Pat. No. 5,573,229 which uses a bulky, heavy and cumbersome CRT driven units to display simulation images. These are in contrast to the small robust and light in weight display systems of the current invention.

Instead of an expensive standing-alone simulator, such as the commercially available product sold under the trademark E&S® of Evans and Sutherland Corporation (Salt Lake City, Utah), periscopic optical training is provided to save cost and improve sense of reality. In periscopic optical training, computer-based simulation and control systems are installed within the exact operational vehicles prior to a training session. This allows an operational armored vehicle also to serve as a training vehicle in order to reduce the cost of producing and maintaining separate training facilities, such as an expensive stand-alone flight simulator. Such a periscopic optical training vehicle puts the personnel to be trained in a more realistic environment.

The periscopic optical training vehicles eliminate the needs in ships and facilities to provide specialized training equipment, and allow training operations and battle simulations to occur at any base and at any time. Since the training occurs within real vehicles, the experience is more realistic and directly transferable to wartime operations. The crew can train in a more team-oriented environment and learn to react in concert with team members.

There is a need for an effective periscopic optical training system which allows the individual, crew, or unit to exercise precision gunnery and navigation skills, and aids in mission planning and rehearsal. Many of the periscopic optical training vehicles, such as a tank or a submarine, do not have an open field of view thus periscopic devices permit a limited view of the external environment. Such periscopic devices have to survive environmental (particularly shock and vibration) challenges. Such ruggedness and ability to withstand shock while retaining their optical properties and also convenient and practical control (i.e. prevention) of straylight leakage from the vehicle interior providing a cue for an enemy is crucial.

Several types of prism or mirror systems have been used to protect the periscopic prisms from environmental damage by various mounting and isolation schemes and these have served well and similar arrangements are implied for use here. U.S. Pat. No. 4,033,677 discloses a Periscope Blackout Blind Construction which is essentially a sliding flexible stray light stop to prevent enemy detection of a light leak from the interior of the vehicle. U.S. Pat. No. 4,065,206 teaches a Ballistic Protected Periscope Construction which introduces some optically transparent shock absorbing material between optical elements to keep them from shattering particularly during attack. U.S. Pat. No. 4,149,778 uses pressurized gas in the shock absorbing volume in U.S. Pat. No. 4,065,206. U.S. Pat. No. 4,110,011 describes a periscope construction which introduces a beamsplitter in the periscope optical train so that two viewers can look simultaneously.

There is a need to provide an effective and ecomonical periscopic optical training system with a periscopic device for viewing the external environment for the military and other personnel who may be in protected premises such as a tank, or amphibious vehicle or other mobile or immobile means, or in certain gaming situations and applications where realistic simulated and real views are needed.

SUMMARY OF THE INVENTION

It is an object of the present invention to provide periscopic optical training for operators of vehicles or other apparatus that are equipped with a periscope sighting device that has the properties of allowing both a real field of view and a training field of view to be presented to the operator.

It is another object of the present invention to provide a compact optical display arrangement that uses a non-mechanical method to allow multiple images to be combined in a periscopic sighting device where each image can be selectively displayed or merged depending on the operator's needs.

It is a further object of the present invention to present in a periscopic sighting device a video display with similar scale to the external world and in registration with an external scene to the extent where it is difficult to discern the difference between what is a real, and what is a simulated scenario.

It is a further object of the present invention to provide simultaneous operation of multiple training fields of view that when presented through the multiple periscopic sighting devices provide a large field of view without blind spots up to and including 360 degrees total coverage so that the operator is immersed in a panoramic surround.

It is a further object of the present invention to relay a scene from the outside world by environmentally robust optical prisms or mirrors that are shock mounted and impervious to attack and attempts to damage them.

It is a further object of the present invention to synthetically generate dynamic scenes as prepared by a video processing computer that can extract the salient features of the surrounding environment and synthesize engagement scenario simulations which are presented to the user/trainee as realistic in both temporal and visual sensation to an extent which closely simulates the real world outside of the apparatus so that practical and changeable engagement scenarios can be undergone by the user to his advantage for the accumulation of realistic training experience without loss of life, or limb or encounter with other dangerous environments.

It is a further object of the present invention to reduce the data rate of the dynamic scenes so that images can be digitally transmitted through slip rings and other data rate limiting junctures to provide real-time seamless spanning of multiple periscopic sighting devices.

Other objects and advantages of the present invention may be seen from the following detailed description:

The present invention, has a remote scene sampling system, which consists of a training device, with an image detector or a video transducer, of a solid state microelectronic type which may be a CCD, CMOS, CID, or other image detecting array which avoids the use of bulky and cumbersome cathode ray and displays, large liquid crystal planar displays frequently found on other types of training and display apparatus.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein.

DETAILED DESCRIPTION OF THE PREFERRED EMBODIMENTS

Figure 1A:
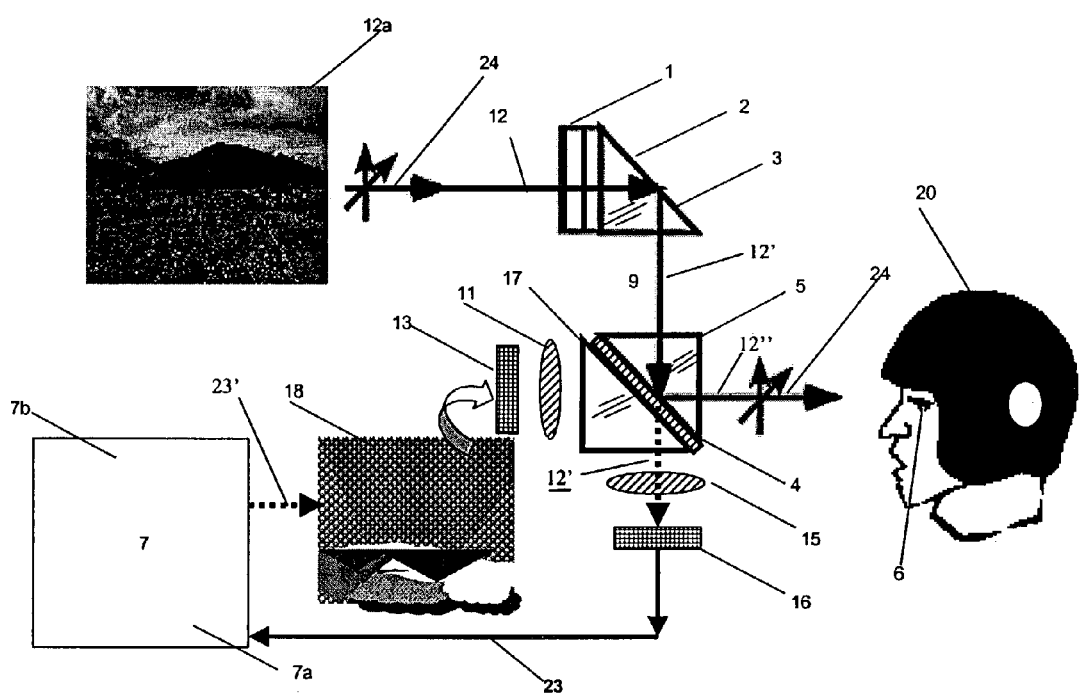
FIG. 1A depicts a schematic diagram of the system with light travelling routes according to a first embodiment of a periscope system with a liquid crystal light controller and an airspace included for shock isolation according to the present invention.

FIG. 1A is a schematic diagram of the system, a user 20 and the relationship therebetween. The system includes periscopic optics, a microprocessor 7, and an image display device 13, and periscopic optics. The periscopic optics include an entrance window face 1, a periscopic fold prism 2, a liquid crystal light control device 4, a periscopic fold prism 5, a block relay prism 17, which directs the collimated image light through the periscopic fold prism 5 by means of passing through the liquid crystal light control device 4, which contols its passage and superposition on the incoming collimated scene light as seen by the user 20. Each of the prisms 2, 5, 17 has a wedge shape with at least one right-angled triangular end face and three side faces connecting three sides of the end face. The three side faces include a hypotenuse side face connecting a hypotenuse side of the end face and two edge side faces each connecting one of the two remaining sides of the end face. Two of the prisms 5, 17 have their hypotenuse side face thereof against each other, and the prism 2 has an edge side face facing toward an edge side face of the prism 5.

Referring back to FIG. 1A, a light 12 from an external scene 12a enters the periscopic fold prism 2 through the entrance window face 1 such that it is totally internally reflected nominally by 90 degrees from a hypotenuse side surface 3 of the prism 2. The reflected light 12' then travels through a shock isolation airspace 9, the periscopic fold prism 5 and the liquid crystal light control device 4 to be secondarily reflected to the user's eyes 6. The secondarily reflected light 12" is still unfocused. A simulation/training image 18 may be generated internally or imported from an external source by the microprocessor 7. A dynamic scene presentation may be prepared by the microprocessor 7 which extracts the salient features of the surrounding environment and synthesizes engagement scenario simulations which are presented by means of one or more small micro display arrays (of approximately ½ inch in size 13, such as one of those manufactured by Emagine Corp, Hopewell Junction, N.Y.) to the user/trainee 20 as realistic in both temporal and visual sensations to an extent so that practical and changeable engagement scenarios can be undergone by the user to his/her advantage for the accumulation of realistic training experience without loss of life, or limb or other dangerous environments.

To generate the simulation/training image 18 internally, the reflected light 12' is alternatively shared with the block relay prism element 17, and from thence into an imaging optic (i.e., a lens) 15, which focuses the passing through light 12' onto an image detector 16. The shock isolation airspace 9 can be replaced by pressurized gas or air. An output signal 23 of the image detector 16 is then directed to a microprocessor 7 which extracts certain external scenery information from the output signal 23 by means of various algorithms which extract data about the scene content using threshold values of sensor voltage and/or current output, which are variable and may be preprogrammed, or adjustable according to the users needs. These thresholds might be based on temperature, color, height, width, velocity, spatial frequency signature content, data fusion combinations, Fourier Transform or Walsh-Hadamard transform content or any of an array of other criteria, such as those described in the "Localized Radon Transforms" described in U.S. Pat. No. 6,424,737, depending on the nature of the engagement scenario. Some of this data may be handled on-line or may be retreived by comparing it with previously characterized stored data. This extracted information 7a is further processed to synthesize activity sequences based on the external scenery information in order to provide a pragmatic training sequence for the trainee or other users. The synthesized information 23' leaves the microprocessor 7 in electronic form then is used to generate a synthetic scene 18 similar to the real external scene 12a but with augmenting features to be displayed on an image display device 13. The light from the display 13 is then rendered to a collimated state by means of a collimating lens 11 which directs the light from the display 13 to pass through a block relay prism 17 so as to be aligned with the users eyes 6, and at the user's option, enters the eyes of the user from the same direction as the light 12 from the external scene 12a. Thus the user/trainee 20 is presented with an option of seeing the synthetic scene generated in the microprocessor, the real scene, or a superposed view of both of these in an overlay fashion.

Figure 1B:
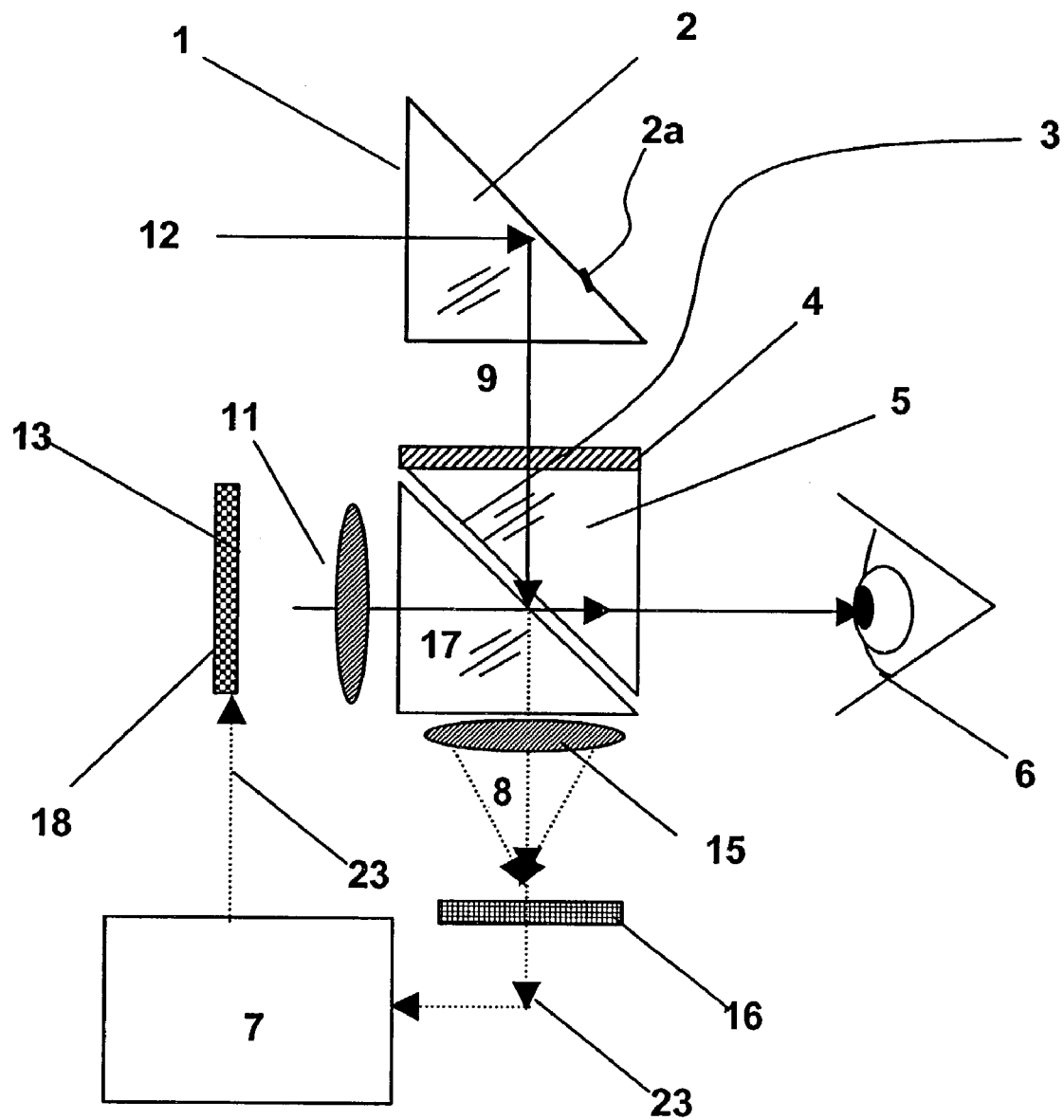
FIG. 1B exhibits only the basic arrangement of a second embodiment of a periscope system according to the present invention without the external environment.
Figure 1C:
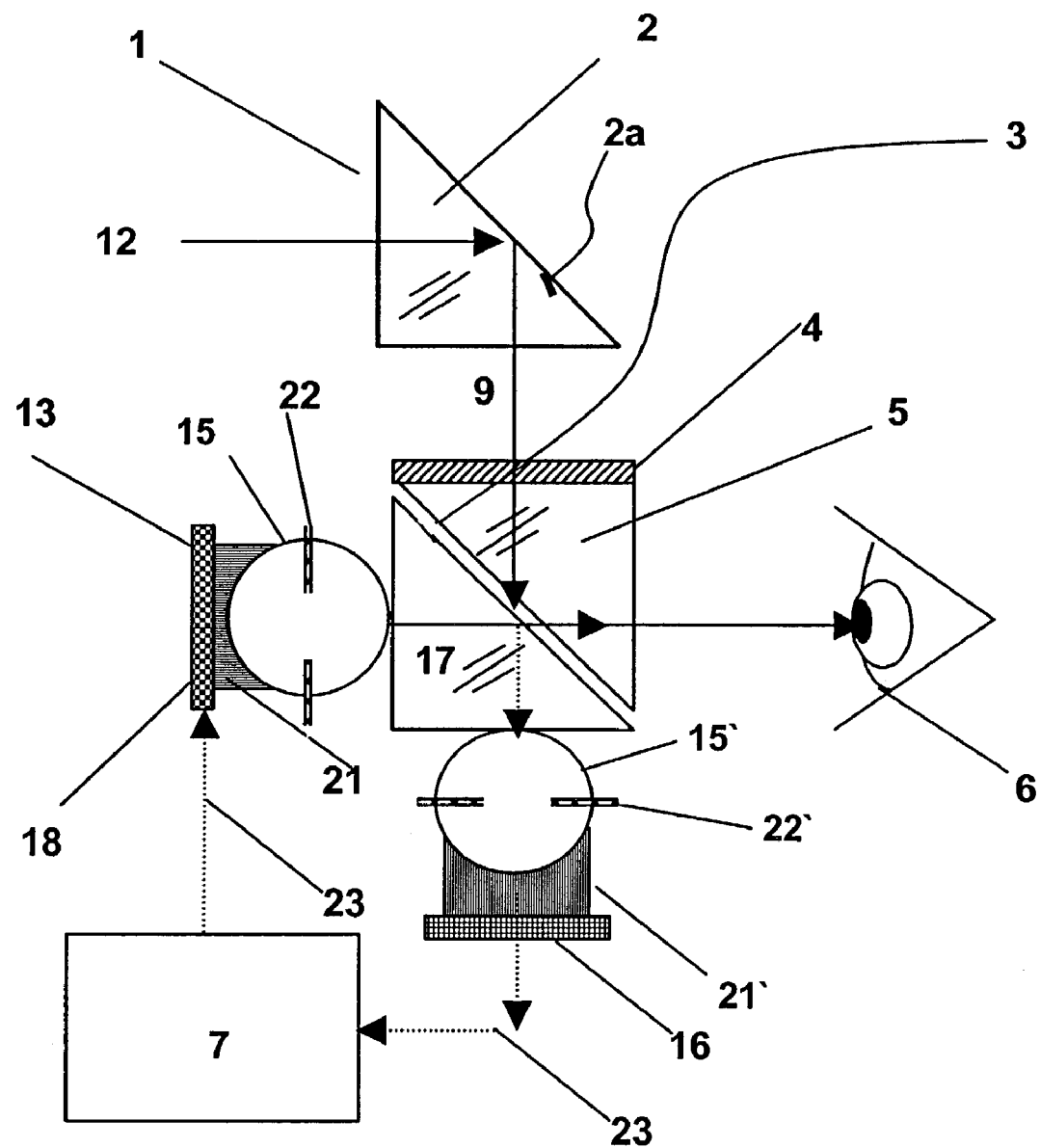
FIG. 1C shows a third embodiment of the periscopic system according to the present invention using spherical lenses with a large field of view and fiber optic field lenses in a distortion compensating manner.

The basic arrangement of a modified periscope system of FIG. 1A is shown without the external environment in FIG. 1B. A transparent medium 8 placed between the lens 15 and the image detector 16 is preferably dry nitrogen but may be air or another transparent non-reactive gaseous medium, and may be hermetically sealed at atmospheric ambient pressure or an elevated pressure and protects the system from contamination. The liquid crystal light control device 4 is moved from the position between the prism 5 and 17 to the top of the prism 5. The liquid crystal control device 4 is placed between two hypotenuse side faces of the prisms 5, 17 (FIG. 1A) or placed between two edge side faces of the prisms 2, 5 (FIG. 1B). In FIG. 1C, the system is modified by substituting the lenses 11, 15 with central stops 22, 22' to control image quality in a manner well-known in the art. These ball lenses 15, 15' have a nearly constant resolution performance over very large fields of view but are partially handicapped by image distortion and having a very large field curvature. The distortion and curved field effects are largely compensated and substantially counter-acted by two field-flattener devices 21, 21' and two ball lenses, 15, 15'.

Figure 2A:
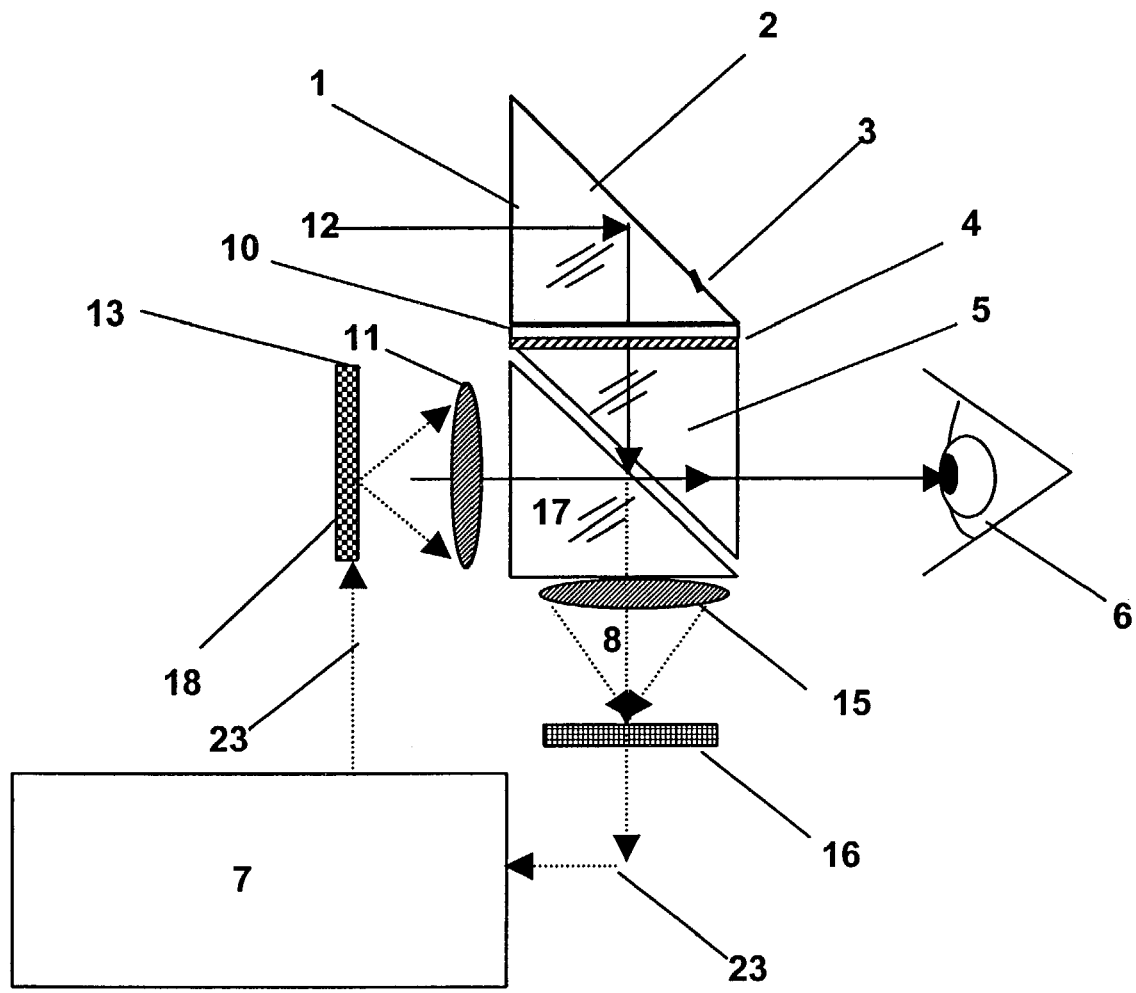
FIG. 2A is a fourth embodiment of of the periscopic system according to the present invention with the inclusion of a special mounting material rather than an air space in the arragement to provide for shock and vibration isolation.

In FIG. 2A, a more compact form of a shock isolation layer 10 is added to the device arrangement in FIG. 1A in lieu of the shock isolation airspace 9. The sickness of the shock isolation layer 10 may be from a few thousandths of an inch thick, to a substantial fraction of an inch thick, in part dependent on the transmission characteristics of the substance. The shape of the shock isolation material may cover the whole face of the periscopic fold prism 2 or may be in the form of a gasket around the edges. Such an inclusion of the shock isolation layer 10 may be any pressurized or non-pressurized isolation cell devices. The inclusion of such isolation cell devices may be at more than one location in the system in order to provide better shock isolation. Such shock isolation techniques are well-known and have been used extensively.

Figure 2B:
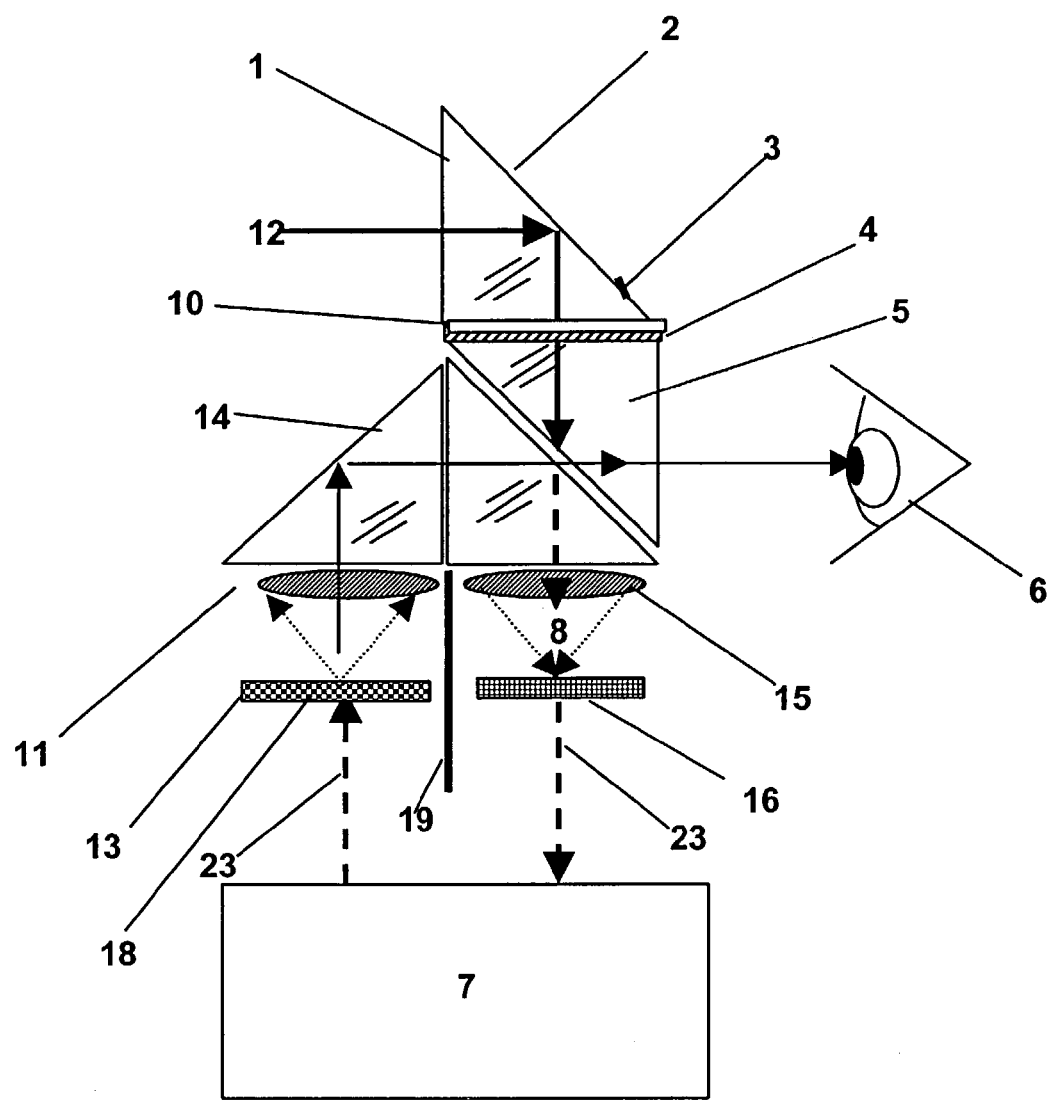
FIG. 2B depicts a fifth embodiment of the periscopic system according to the present invention for avoiding obstacles in the line of sight of the optical train by the addition of a prism.

FIG. 2B presents another alternate arrangement of the system for avoiding proximat hardware obstacles at or near the line(s) of sight of the system by the addition of a prism 14. Such a need is encountered in close quarters, such as in a tank, an amphibious vehicle, or other conveyance. In this embodiment, the optical/electronic system have been in part re-oriented, comparing with FIG. 2A, and the fold prism 14 is introduced to allow for a different system form factor an example of which can be seen in FIG. 3, which shows the relative spatial relationship between several of the viewing systems arranged to provide several differing but overlapping fields of view which will allow for complete viewing of the entire surrounding area simultaneously or individually at the option of the user.

In some arrangements of this type, there arises a possibility for straylight not collected by the detector array 16 which reflects into the path of the image display array and thus reducing contrast in the image perceived by the user. Such a probelm is prevented by the introduction of a straylight control baffle 19 as shown in FIG. 2B.

The number of viewing systems is arbitraily chosen as 6. Six periscope fold prism devices 2 are shown from a top view six sets of the above-mentioned systems to receive lights from directions 24a–24f with the user/trainee 20 in the middle. As such, a large field of view without blind spots and up to and including 360 degrees total coverage is provided such that the user is immersed in a panoramic surround.

The method described here incorporates a display system that can be integrated with periscopes to act as a periscopic optical training device. It is particularly noteworthy that because the arrangements in this invention are compact, and do not occupy a large volume or bulky structure, an advantage can be obtained in the training scenario wherein the user is totally immersed in a panoramic field of view and can use it with several periscopic devices simultaneously without the need for moving any of the apparatus involved to allow shifting of the field of vision as might normally be expected in a system with multiple fields of view, thus giving a more natural field of view relationship with the normally presented fields and the in-suit fields of view.

The periscopes of interest may use a simple folding mirror design, or a prism design, that relays the scene to the viewer. In these arrangements, the reflections deliver an erect image of the original scene, usually without any augmenting features, such as magnification. The periscopes are usually viewed without any viewing eyepieces. The mirrors or prisms are fixed in place so no correction is necessary, in contrast to the case where the mirrors can rotate, which would require correcting optics (such as dove prisms) to maintain an erect image. To the operator, looking at the viewing port is similar to looking directly out of a window, although the actual window is displaced vertically.

Figure 4:
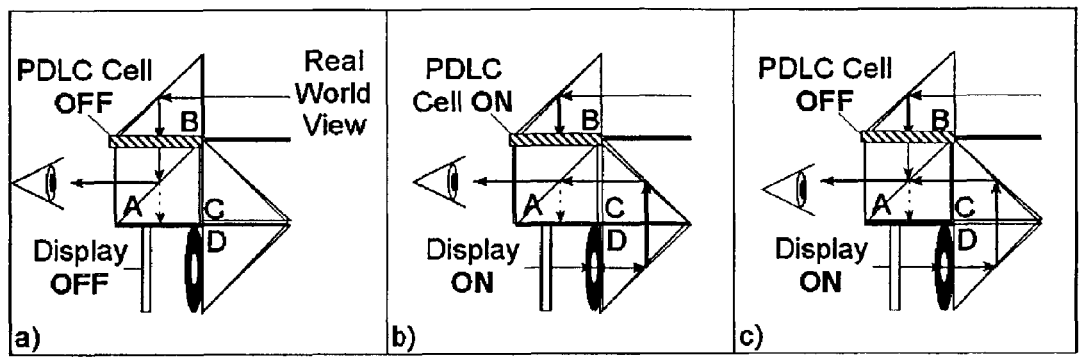
FIG. 4 is an optical schematic diagram a sixth embodiment of the periscopic system according to the present invention showing how the system may be set to allow either a synthesized field or a real field or both may be viewed simultaneously with a PDLC cell.

FIG. 4 shows a conceptualized drawing of the three modes of operation that uses liquid crystal technology to create a monolithic optical assembly to non-mechanically switch between three modes of operation. The polymer dispersed liquid crystal (PDLC) cell 4 is used to selectively block the real-world view. Component A is a beamsplitter, while B, C, and D are prisms. In FIG. 4, the PDLC 4 is transparent, allowing the viewer to see outside the vehicle through the periscope. When the display 13 is turned off, no computer-generated information can be transmitted to the user. In this OFF mode (FIG. 4a), the display is transparent to the vehicle operator who can view the world outside of the vehicle in a normal fashion through the periscope. When the PDLC 4 is turned on to block the real-world view, while the display 13 is turned on to show synthesized images to the viewer. In this ON mode (FIG. 4b), the outside-world view is blocked such that the operator sees the simulated OTW view of the world presented by the on-board in-suit computer or the microprocessor 7. When the real-world view is not blocked and the synthetic video is available, both images are visible to the operator. In this OVERLAY mode of operation (FIG. 4*c*), the display is used to superimpose simulated information with the outside view. In training, this capability can be used to overlay synthesized targets on the real-world view.

When the internally generated simulation image 18 is relayed from the micro-display 13 at a similar scale to that of the true image 12 and a image quality of the internally generated simulation image is difficult to be discerned from the true image, subliminal color coded cues are added in or around the display to discern the internally generated simulation image 18 and the true image 12 in the three different operation modes.

The method of grasping then overlaying a high resolution display field and a low resolution background display field, such as described in U.S. Pat. No. 5,980,044, may be adopted by the invention in order to obtain a synthetic image which appears to be at the same distance for both while maintaining realism.

The display's brightness can be controlled to vary the intensity of the overlaid graphics on the outside scene. During operations, information such as vehicle navigation information and/or weapons status can be incorporated in the OTW view without obscuring important image details. This allows the operator to use the periscope to focus on the scene and at the same time receive real-time information that relates to his vehicle and the big picture.

PDLCs operate on the principle of electrically controlled light scattering. PDLCs consist of liquid crystal droplets surrounded by a polymer mixture sandwiched between two pieces of conducting glass. When no electricity is applied, the liquid crystal droplets are randomly oriented, creating an opaque state. When electricity is applied, the liquid crystals align parallel to the electric field and light passes through, creating a transparent state. Typical specs are 80% transmissive in the transparent state and 5% transmissive (mostly scattered light) in the opaque state.

Figure 5:
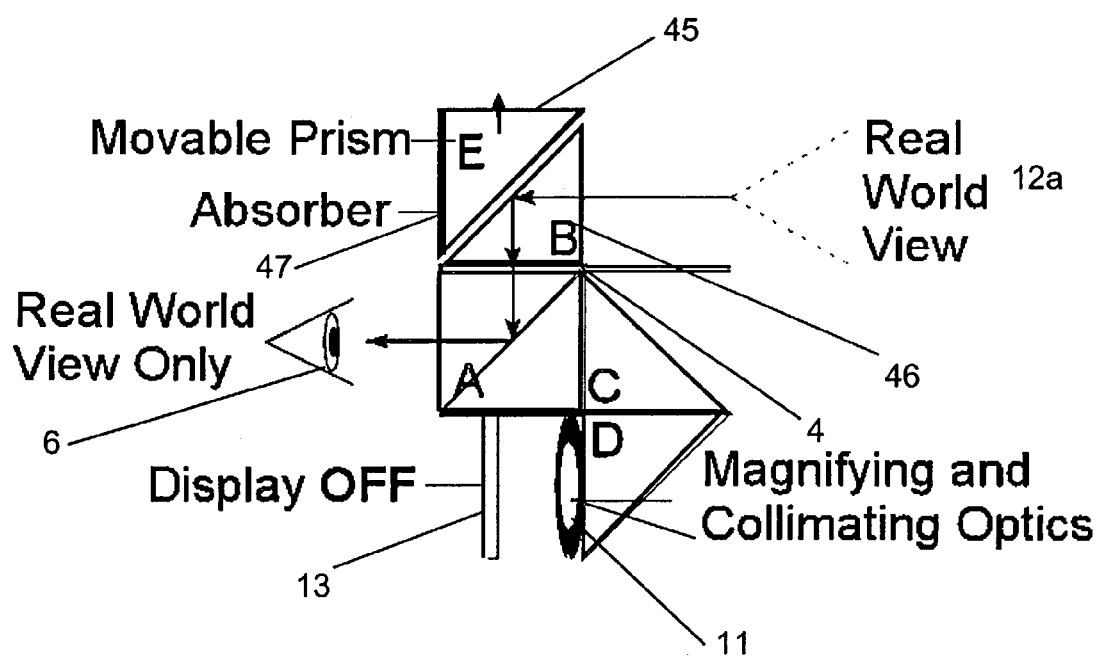
FIG. 5 is an optical schematic diagram a seventh embodiment of the periscopic system according to the present invention showing how the system may be set to allow either a synthesized field or a real field or both may be viewed simultaneously with a moveable prism E.

An alternative embodiment of the PDLC that allows the user's selection among the three modes of view using mechanical actuation is shown in FIG. 5. The real-world view is controlled by mechanically moving a prism E, 45 in or out of contact with the prism B, 46. Total internal reflection (TIR) occurs when the two prisms are not touching, causing the real-world view to be deflected to the eye from the beamsplitter A. When the two prisms B and E contact and are optically coupled, the TIR conditions are not satisfied such that the real-world view passes through the prisms B and E. A light absorber 47 is placed behind the prism 5 for absorbing the passing-through light thereby preventing light leak. In either case, the synthetic image is controlled by turning on and off the display.

The views are introduced in collimated space in a realistic fashion so that real and synthetic scenes appear to be coming from the same point. Also, collimation of the electronic display yields a virtual image appropriate for the human eyes. Special attention is placed on the design of a magnification system that allows the synthetic image to fully fill the periscope view port like the real-world view.

Figure 6:
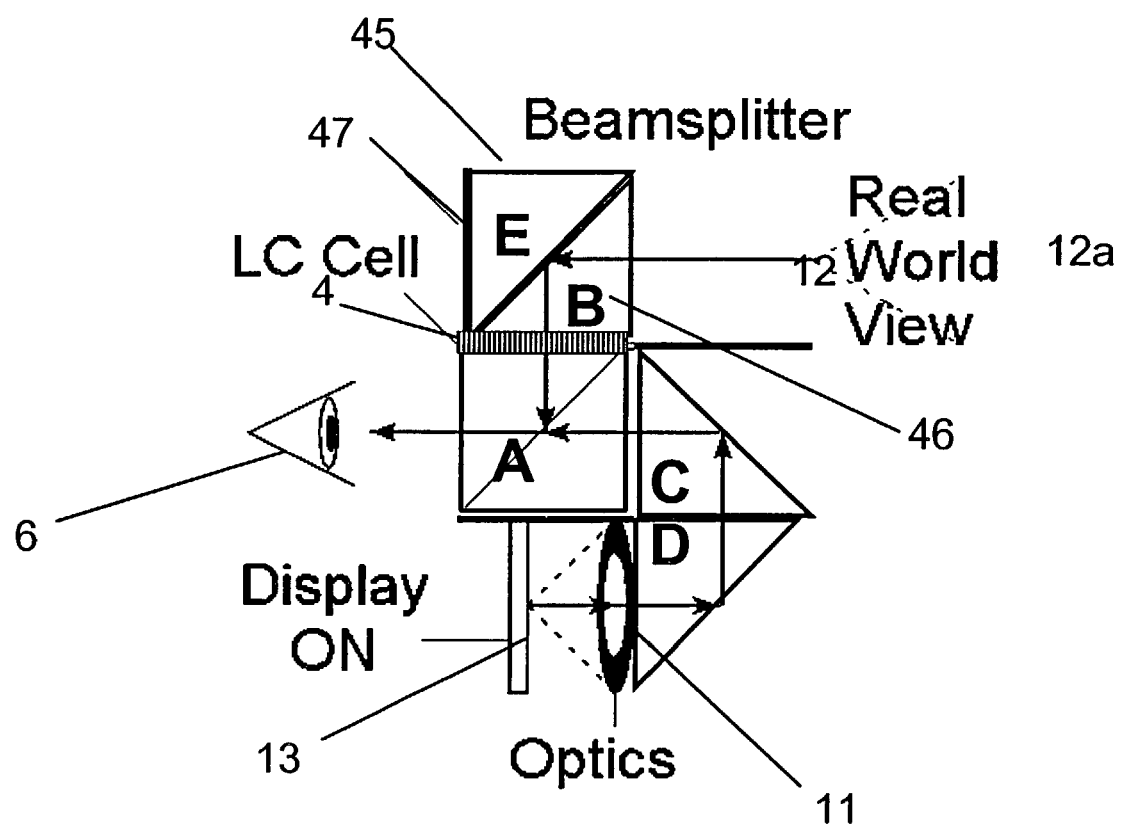
FIG. 6 is an optical schematic diagram an eighth embodiment of the periscopic system according to the present invention showing how the system may be set to allow either a synthesized field or a real field or both may be viewed simultaneously with a LC cell.

Since there are many difficulties in creating good optical contact across the entire surfaces between the beamsplitter A and the prism B, as well as keeping this area completely free of any debris, another configuration is shown in FIG. 6 for providing a combined periscope/display system. These approaches involve fabrication of a monolithic optical system of the type presented in this disclosure, which are not commercially available but must be assembled from off the shelf optical components and which make use of liquid crystal technologies to selectively transmit and block scenes.

Liquid crystals are an alternative method to control TIR within a prism block, instead of mechanically moving or rotating the block, by varying the effective index with the application of a voltage differential across the liquid crystal cell 4 as shown in FIG. 6. This type of liquid crystal cell operates on the principle of optical birefringence. An AC voltage applied across this type of liquid crystal cell causes a change in the birefringence of the cell, thus changing the equivalent refractive index of the optical area of interest. When placed between polarizers, the liquid crystal cell can be tuned to transmit one polarization state. The drawback to this technology is that polarized light is required, which can degrade important details of the real-world scene. However, this technique could be used on the synthetic image and can be used to vary its brightness.

A final method of manipulating the path of the image is shown in FIG. 6, which uses the ability of liquid crystals to rotate the polarization of incoming light. In this configuration, the appropriate voltage would be applied to the cell to either reflect or transmit the image through the beamsplitter A. As shown in FIG. 6, the LC cell 4 can configured to block light reflected from prism B 46 or allow the light to transmit through to Prism A and into the observer's eyes 6.

In short, the invention provides eight embodiments of periscopic optics. the periscopic optics are shock mounted and impervious to environmental or military attack. The first embodiment in FIG. 1A includes a beamsplitter equivalent A (composed by the prisms 5, 17 and the liquid crystal light control device 4 placed there between) and a prism B. The second embodiment in FIG. 1B includes a beamsplitter equivalent A (composed by the prisms 5, 17, but the liquid crystal light control device 4 is placed on the top of the prism 4) and a prism B. The third embodiment in FIG. 1C includes the beamsplitter equivalent A and the prism B of the second embodiment in FIG. 1B but the lenses 11, 15 are substituted with ball lenses 22, 22'. The fourth embodiment in FIG. 2A includes the beamsplitter equivalent A and the prism B of the second embodiment in FIG. 1B but the space between A and B is substituted with the shock isolation layer 10. The fifth embodiment in FIG. 2B includes the beamsplitter equivalent A and the prism B of the fourth embodiment in FIG. 2A, and the prism C. The sixth embodiment in FIG. 4 includes the beamsplitter A, the prisms B, C of the fifth embodiment in FIG. 2B, and the prism D. The seven embodiment in FIG. 5 includes the beamsplitter A, the prisms B, C, C of the sixth embodiment in FIG. 4, and the prism E. The eight embodiment in FIG. 6 includes the beamsplitter A, the prisms B, C, C, E of the sixth embodiment in FIG. 5, and the LC cell.

Special attention should be paid to the effects of polarization, temperature, entry angle, and transmittance on the real world image when using liquid crystals according to the invention. To mitigate wavelength or color issues, temperature compensated driver circuitry (not shown) is employed.

Other considerations in the system's optical design include magnification optics and material choice. Because of the displays' compact sizes, optics are needed to enlarge the displayed images. The display will be magnified to a size equivalent to the size of the field of view of the periscope in order to give the operator a convincing simulated OTW view, and to properly place overlaid information. A significant portion of the invention involves this aspect of the optical subsystem with a goal of limiting the distortions introduced by the magnification optics, such as the ball lenses 11, 15.

Figure 8:
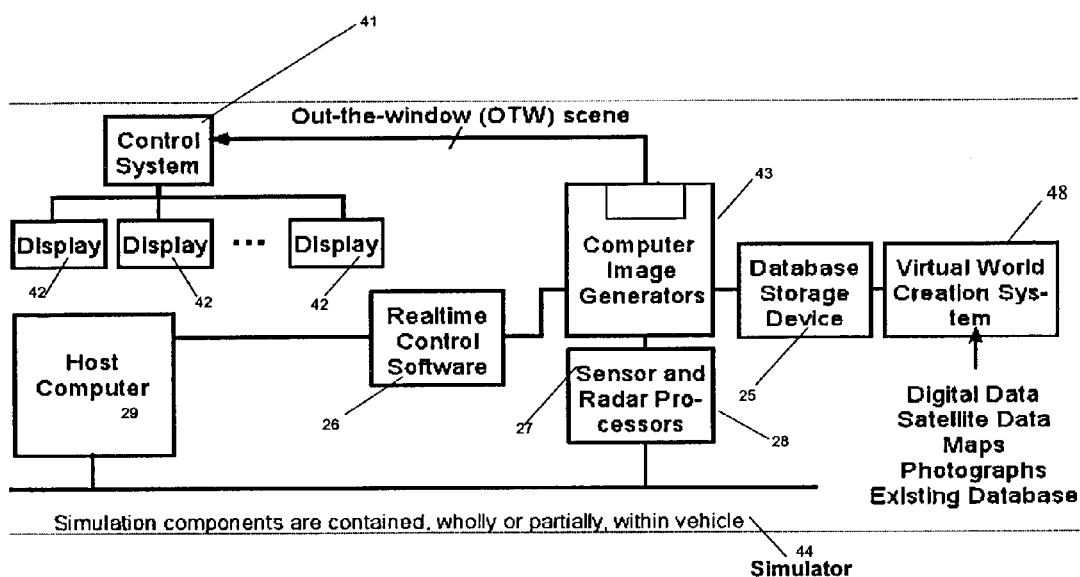
FIG. 8 is a block diagram showing the relationships between major electronic components of the system and the component interaction.

FIG. 8 is a block diagram showing the relationships between major electronic components of the system and their interaction with the periscopic optics. The host computer 29 controls vehicle peripherals, motion controllers, and sensors, supplying data to and accepting commands from the real-time control software 26. The sensor and radar processors, geographical and vehicle database storage device 25, and virtual world creation system 48 supply information about the virtual world to a computer image generator 43. The computer image generator 43 performs the complex calculations to create the high-quality images that are displayed in real time on the display 13 or a display system 42. The means of sensor processing, radar processing and simulation creation are computer software algorithms which must be generated for the particular application. An example of a commercially available software system which does similar operations is the Harmony2® system produced by Evans and Sutherland Corporation for use in personal computer systems.

Figure 3:
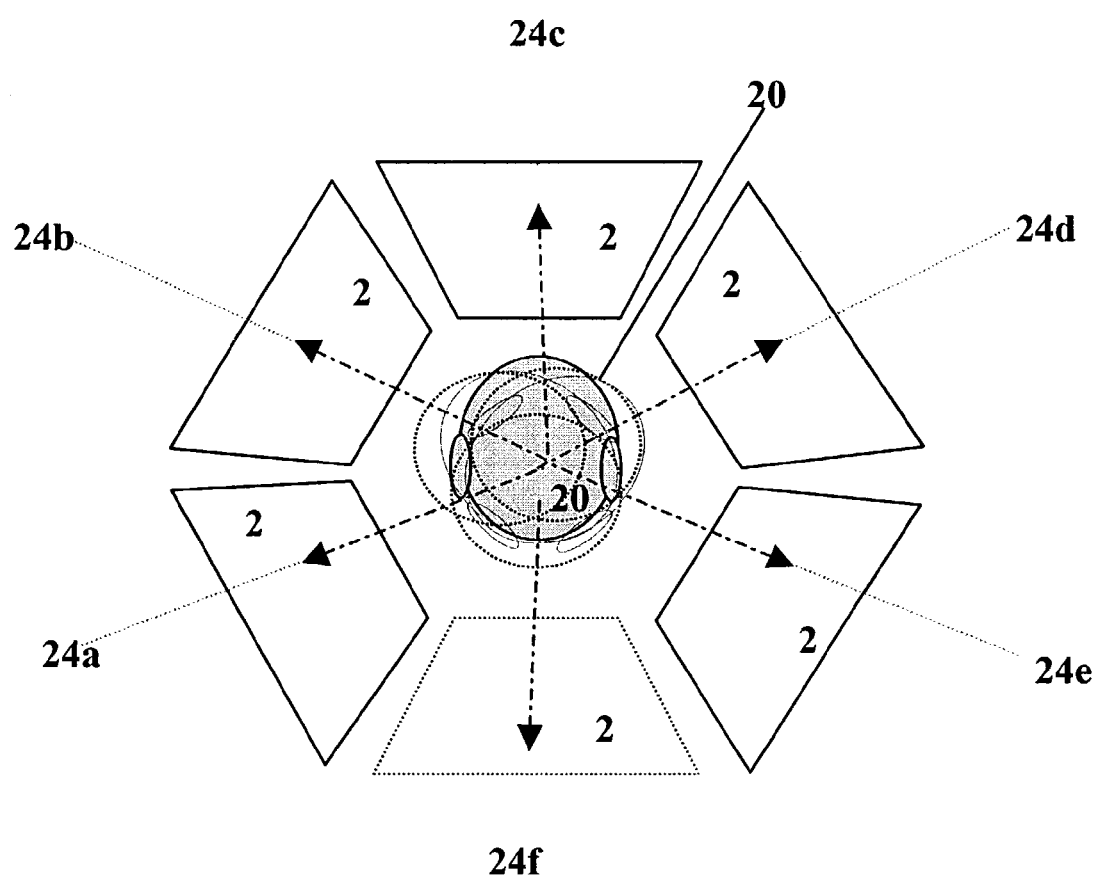
FIG. 3 is a top view showing how several viewing blocks (24a–24f) with differing orientations can be arranged around a single trainee 20 or other user to permit a panoramic field of view coverage.

The display system 42 is usually composed of multiple monitors or projectors as shown in FIG. 3 to recreate a wide field of view that completely immerses the trainee. Spanning the scene across multiple monitors can be accomplished in hardware or software that takes any 3D application, such as simulation, training, or entertainment software, and enables the graphics applications to seamlessly span an unlimited number of computer displays.

The electronic interface shall provide all of the data, power and control interfaces required to achieve complete performance and functionality in a common, standard interconnect that observes standard communication protocols; the interface provides necessary control signal generation, timing, logic level shifting, and signal buffering as required for proper image generator system operation.

Figure 7:
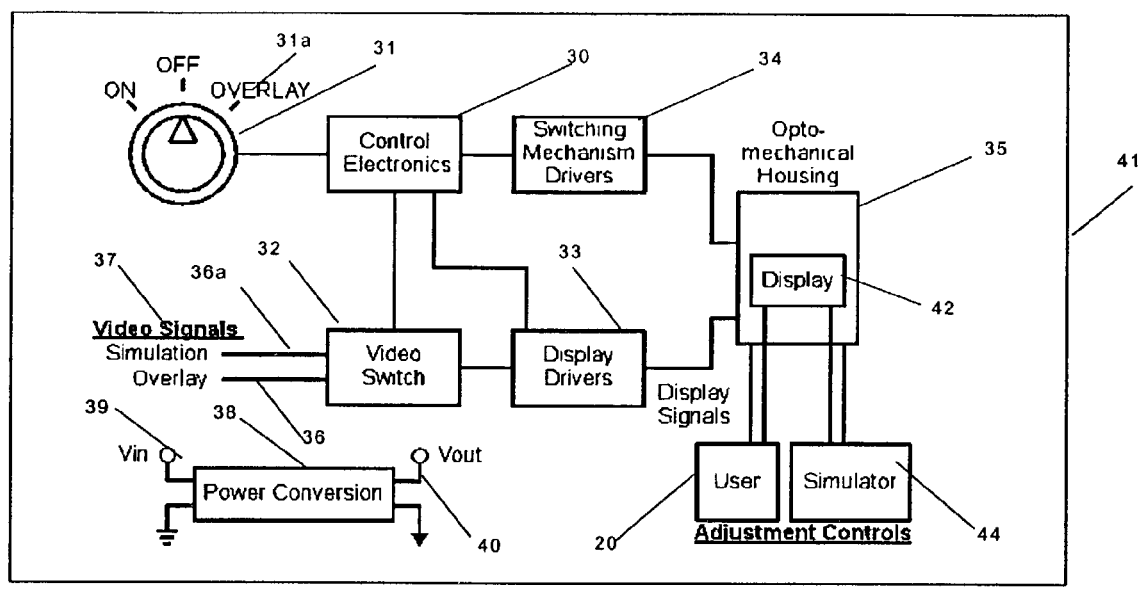
FIG. 7 is an electical/electronic block diagram showing the control system in FIG. 6, the power source, and control options of the user.

A layout of the functional blocks for the electrical controlling system 41 for controlling the internal periscope display 13 and the periscopic optics is shown in FIG. 7. The control electronics 30 accepts input from a selection switch 31, which allows the operator to choose three display mode to be discussed later. The control electronics 30 turns a video switch 32 and display drivers 33ON or OFF, and sends the appropriate signals to switching mechanism drivers 34 such that the user 20 can see the correct view through an opto-mechanical housing 35. The size of the housing 35 depends on the operation environment to be illustrated via FIGS. 9–11 later. The output of the switching mechanism drivers 34 depends on the chosen technique for switching. If liquid crystal shutters are deployed, a sinusoid signal is output to control the transmission properties of liquid crystal cells.

The video switch 32 accepts simulation video signals 36*a* when the selection switch 31 is in the ON position, and the Overlay video signal 36 when the selection switch 31 is in the OVERLAY position. The video signals 37 are in an RGB (Red, Green, Blue) video format that is standard for desktop computers, or a digital signal that is becoming standard for flat-panel display monitors. The display drivers 33 process the video signal from the video switch 32 that drives the display.

The integrated circuits (IC) for the display drivers 33 are usually offered by the display manufacturer as part of a total solution. These ICs accept multiple video formats, such as RGB, NTSC, or digital, and convert these to drive the displays. Adjustment controls are made available to the user for controlling aspects of the video output such as contrast, brightness, color, size, geometry and gamma correction, and ergonomic adjustments such as position and tilt. These adjustments can also be made via software.

The power conversion 38 outputs voltages 40 to the other blocks. The input voltage 39 is set at 28V. DC—DC converters will be selected to efficiently convert and provide regulated outputs to the electronics circuitry. The aggregation of these items 30 to 40 in FIG. 7 constitutes the controller of the system.

Optionally, the "Method and Apparatus of Compressing Images Using Localized Radon Transforms" described in U.S. Pat. No. 6,424,737 may be adopted in the invention to achieve bandwidth compression, and the mothod of using interacting and updatable abstract models to create a real-time multi-sensor synthetic environment described in U.S. Pat. No. 6,128,019 may also be adopted in the invention. In addition, the scene composing techniques disclosed in U.S. Pat. No. 6,034,739 and the multi-level cache controller described U.S. Pat. No. 6,052,125 can be incorporated in the present invention, and the multi-level cache controller described in U.S. Pat. No. 6,437,789 for computation and preparation of display can be incorporated in the present invention.

Figure 9:
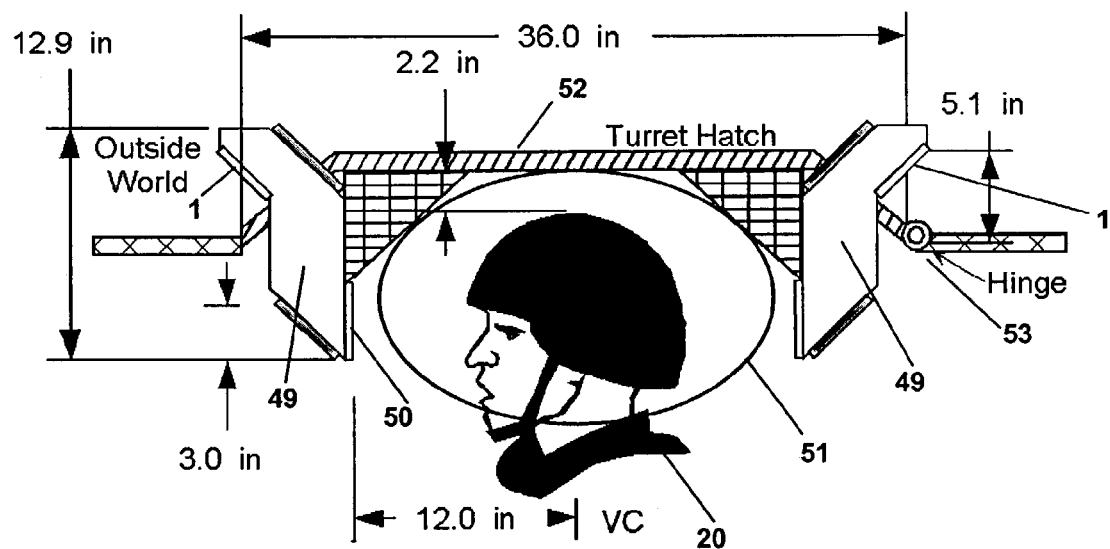
FIG. 9 shows the relationship between the user and the integrated periscopic displays in typical application.

FIG. 9 shows the relationship between the user 20 and the integrated periscopic displays 49 in typical application. The user 20 is positioned within an armored vehicle turret hatch 52 that separates the user from the outside world. The user 20 views the outside world by looking through a window 50 through the integrated periscopic display 49 which transfers an image of the outside world through the entrance window 1. The vehicle turret hatch 52 may include a hinge 53 so for the user 20 to gain access to and from the vehicle. It is important to keep a region 51 around the user's 20 head clear such that the user can operate the vehicle with adequate head movement. In the armored vehicle turret hatch 52, there can be multiple integrated periscopic displays 49 as depicted in FIG. 3 that yield up to a 360 degree view of the outside world from inside the armored vehicle turret 52.

Figure 10:
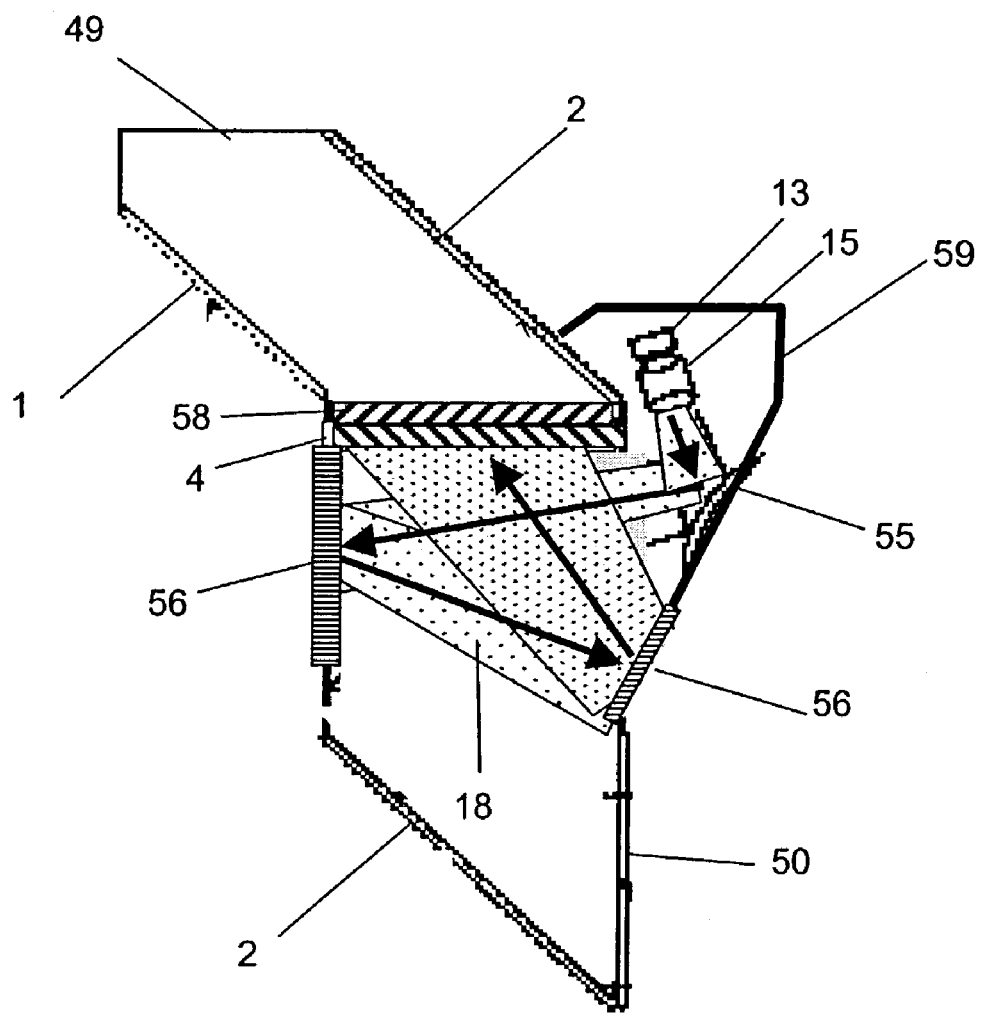
FIG. 10 is a functional diagram of one embodiment of a front projection embedded training periscopic display in FIG. 9.

FIG. 10 shows the details of one embodiment of the front projection integrated periscopic display 49. The image display 13 and the imaging lenses 15 are assembled and housed an integrated display housing 59 to expand the simulation/training image 18. The simulation/training image 18 reflects off of a projection mirror 55 and housing mirrors 56. The projection mirror 55 and the housing mirrors 56 may be configured to have custom curvature so as to optimize the image quality when illuminating the liquid crystal light shutter 4. The housing mirrors 56 are incorporated into the sides of the periscope housing 59 and oriented to reflect the simulation/training image 18 to the liquid crystal light shutter 4 located internal to the integrated periscopic display 49. Such a design puts the display 13 at a comfortable viewing distance for the user 20. When the liquid crystal light shutter 4 is turned "ON", the liquid crystal light shutter changes from completely transparent to opaque which blocks the outside light entering through the entrance window 1 and reflecting off via the periscopic fold mirror 2. When the image display 13 is turned "ON", the simulation/training image 18 illuminates the opaque liquid crystal light shutter 4. This creates a front projection surface such that the user 20 can view the simulation/training image 18 through a viewing window 50 and the periscopic fold mirror 2. The simulation/training image 18 would be directed to the middle of the periscope and viewable as though it were a direct view of the outside world. By placing the liquid crystal light shutter 4 in the middle of the periscope, the simulation/training image 18 will be received at about the same distance as if the user 20 normally views a computer monitor. When the liquid crystal light shutter 4 is in the "OFF" state, the normal periscopic view from the outside world will transmit through the liquid crystal light shutter 4 as if it were a clear piece of glass. A reflective grating device 58 may be added to the system to provide an additional heads up display capability. With the liquid crystal light shutter 4 is in the "OFF" state and the image display device 13 is turned "ON", the simulation/training image 18 will transmit through the liquid crystal light shutter 4 and illuminate the reflective grating device 58. The grating device 58 may be a holographic grating device that preferentially reflects one or more wavelengths of light and transmits others. For example, green light from the image display 13 may be preferentially reflected to the periscopic fold mirror 2 and exit through the viewing window 50. Without blocking from the liquid crystal light shutter 4, both the outside world image 12 and the reflected simulation/training image 18 will be seen by user 20 where the user's eyes 6 will perceive both images overlapping thereby creating a heads up display capability.

Figure 11A:
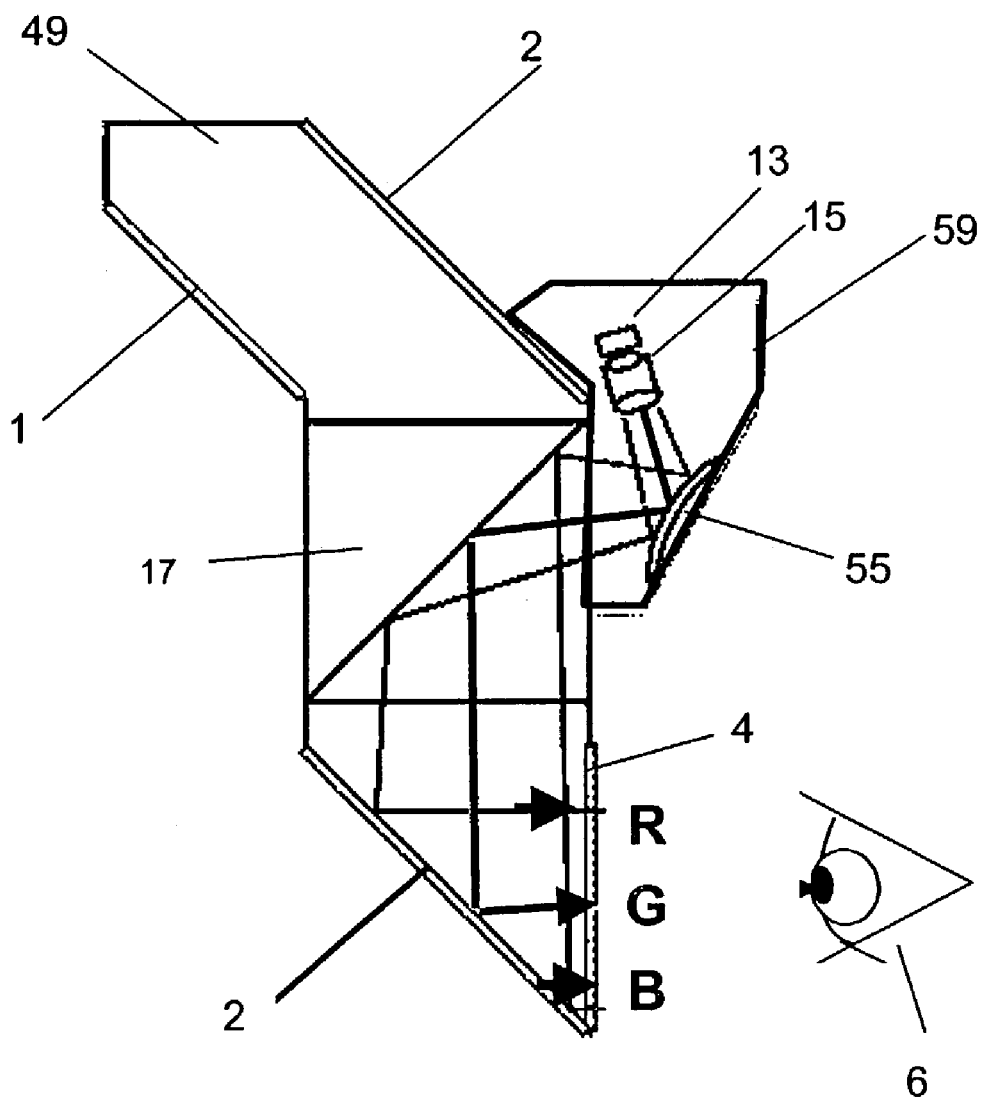
FIGS. 11A–B are functional diagrams of another embodiment of the front projection embedded training periscopic display in FIG. 10.

Another embodiment of the front projection integrated periscopic display 49 is shown in FIG. 11A, which orients the image display 13, the imaging lenses 15, and the projector mirror 55 so that the illumination reflects off of a partially reflective block relay prism 17 and projects onto the rear of the liquid crystal light shutter 4. In this embodiment, the liquid crystal light shutter 4 also functions as the viewing window 50 such that the viewing window 50 is removed. When the liquid crystal light shutter 4 is turned "ON", it changes from completely transparent to opaque such that it blocks the outside light entering through the entrance window 1 and reflecting off of the periscopic fold mirror 2, i.e., the ON mode. When the image display 13 is turned "ON", the simulation/training image 18 illuminates the opaque liquid crystal light shutter 4 so as to create a rear projection surface for the user 20 to view the simulation/training image 18, i.e., the OVERLAY mode.

Figure 11B:
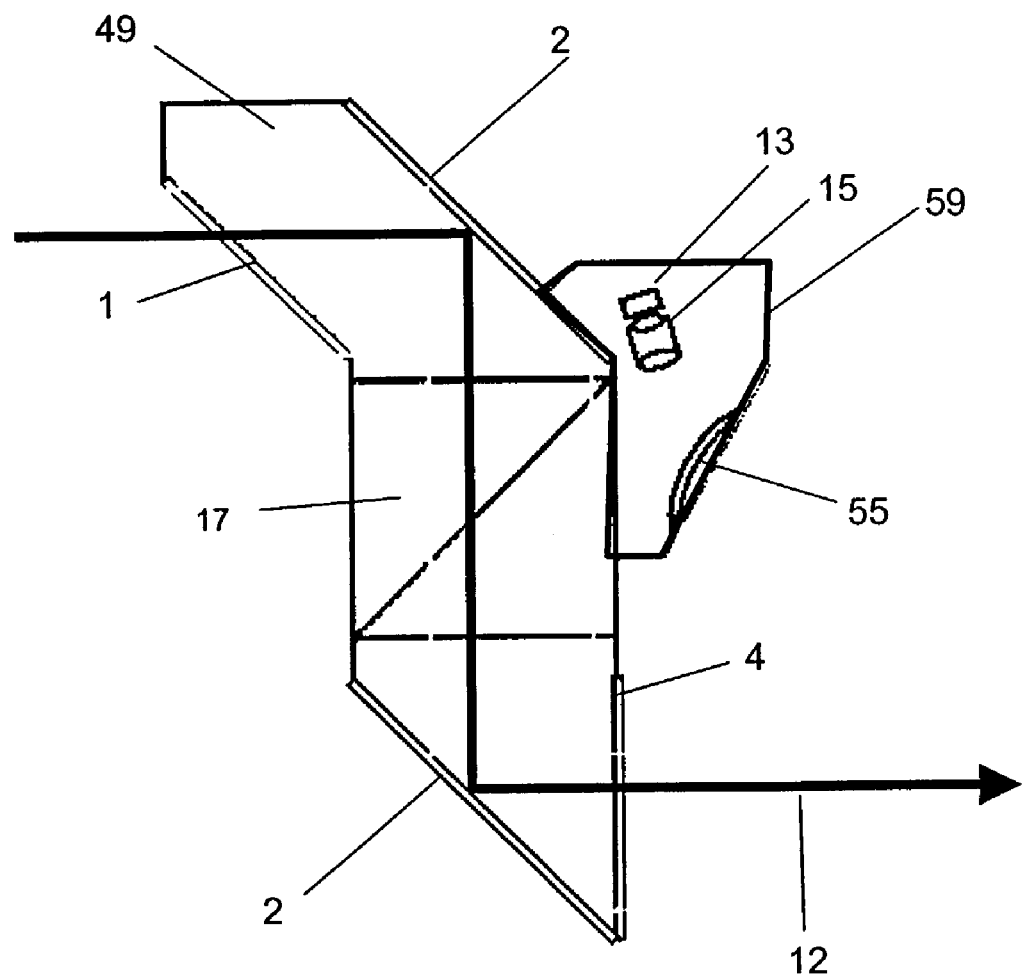

FIG. 11B illustrates that when the liquid crystal light shutter 4 is turned "OFF" and the image display device 13 is turned "OFF", i.e., the OFF mode. In this operation mode, the outside image 12 transmits through the block relay prism 17 and the liquid crystal light shutter 4 to be viewable to the user 20. The partially reflective block relay prism 17 can be optimized to provide the best combination of the transmission of the simulation/training image 18 and the outside image 12 based on the intensity of the image display 13. Preferably, the block relay prism 17 would have transmission characteristics of at least 90 percent transmitting and 10 percent reflecting so as to preserve the majority of the intensity of the outside image 12 for the user 20.

Displays

The display 13 plays a significant role in the performance of the system. There are a variety of factors that contribute to the overall image quality including contrast, resolution, perspective, distortion, flicker, and throughput. The invention identifies the technologies most suited for integration into the periscope that can withstand the rugged environmental conditions, provide sufficient image quality for training simulations, and are small enough to integrate into the periscopes used in armored vehicles.

The preferred embodiment of the display is a microdisplay based on organic light emitting diode (OLED) technology. An organic LED (OLED) is a semiconductor device made by placing organic thin films between two conductors. Light is emitted when current is applied. OLED displays are lightweight, durable, power efficient and ideal for portable applications. OLEDs are easier to manufacture than LCD displays and may replace LCDs in many applications. The claimed advantages over LCDs are greater brightness, faster response time for full motion video, wider viewing angles, lighter weight, greater environmental durability, more power efficiency, broader operating temperature ranges, and greater cost-effectiveness.

Alternative embodiments include microdisplays using liquid crystals, electroluminescence, and miniature displays using liquid crystals and field emitters. All of these technologies are used in flat panel displays (FPDs). Generally, FPDs offer good size, weight, power consumption, and fast refresh rates for flicker-free operation. For more extreme temperature environments, electroluminscent displays offer a wide operating temperature range and comparable performance figures to LCDs. These emissive displays operate by stimulation of a polycrystalline phosphor layer sandwiched between transparent conductive segments. The Table 1 compiles data from a number of manufacturers and information sources about display technologies.

TABLE 1

Display Technologies

| Display Technology | Description/Advantages/Disadvantages |
|---|---|
| Organic LED | Organic thin films between conductive surfaces form semiconductor light emitting diodes Microdisplays 100:1 contrast Low fill factor 67% Low brightness 29 fL Operating Temperature range: −25° to 70° C. Storage Temperature range: −51° to 90° C. |
| Microdisplays | Size < 1.5" High resolution and high pixel density Tend to be lower power than full size displays Requires magnification optics |
| Miniature displays | Size < 5" Low resolution for small display sizes More established commercial technology than microdisplays |
| LCD, general | Available in reflective or transmissive, microdisplays and miniature displays Color and switching speed affected by temperature Normal operating temperature range: 0° to 60° C. Normal storage temperature range: −20° to 80° C. Capable of contrast > 100:1 Brightness > 87 fL (depends on light source) Miniature LCDs are widely used in many commercial applications Twisted Nematic LCD is a mature technology Microdisplays typically use <500 mW including display and driver electronics |
| CRT | The major display technology in use today The standard for comparing brightness, contrast, color fidelity and performance Large, heavy, uses a lot of power |
| Electroluminescent | Polycrystalline phosphor layer sandwiched between transparent electrode patterns. Emit light when stimulated by electric field. Microdisplays 100:1 grayscale Brightness 84 fL Good operating temperature range of −40° to 80° C. Higher power usage than LCD at 2.5 W |
| Field-emitter display | Comparable performance to traditional CRT Similar to CRTs in that it uses electron beams to stimulate a phosphor screen. Instead of a single, large electron gun, FEDs use a large array of small field emitters which emit electrons when exposed to strong electronic fields |

TABLE 1-continued

Display Technologies

| Display Technology | Description/Advantages/Disadvantages |
|---|---|
| Digital Micromirror | Often called thin CRTs or flat CRTs<br>Still in development, though Candescent touts a commercially viable FED<br>High fill factor<br>High reflectivity, good brightness<br>Commercially available from TI for use in projectors.<br>Has undergone tests for ruggedness. |

The periscopic optical training system according to the invention extracts the topographic and other features from the video scene at hand and synthesizes in software a similar display with various threat action algorithms included, so that the computation network could "learn" from practice threats but using the realistic terrain in the training display much as a computer can be taught to learn to play championship chess. It would offer not just simulation, but realistic simulation of the battlefield terrain and potential threats.

As known to one skilled in the art, the video image information used to drive the displays may be used to portray the fields of view available to the user, for other observers having similar arrangements of optics and electronics surrounding them, and alternatively as decided upon by the users information from one or all of the devices may be displayed for any or all such user/trainees. An optional feature of the invention is the inclusion of a beamsplitter in the periscope optical train so that a second viewer can be accommodated.

Alternatively, the information could be used as in a teacher-student relationship between one or more of the users, making it a valuable teaching tool. Such means might permit for example an overiding set of command level information communicated by a secondary communications system allowing each member of the "class" to be exposed to other scenarios than their own permitting a rich and broad range of scenarios to be presented to each individual and also such use would even permit close performance examination of student user/trainees responses in a given situation and thus permit rich experience to be gained without loss or risk to life or limb.

This invention fills the need for a visual display that can be permanently built into the periscopes of military systems for periscopic optical training capabilities. In this application, it is desirable for the display to be located at or inside the periscope so that operators look at the same location for the real-world view and the simulated/synthetic out-the-window (OTW) view.

An improved periscope with special training features is disclosed which has a large field of view and includes hybrid features that allow the user to superpose a computer generated synthetic scene and a real world scene or can be viewed separately as elected by the user. It may therefore be used for multiple realistic training purposes and has further advantages in that the training scenarios synthesized by computational analysis can be based on terrain features extracted from the scene by an an image detector/analyzer. By using the information from the image sensor as analyzed in a microprocessing computer, many realtime training scenarios can be synthesized in a short period of time permitting the trainee to gain a large amount of experience from reality based scenarios but obtained benignly from the surrounding scene. By extracting key features from the sensed scene using low level algorithms a soldier or other user gains extensive experience at much less risk and expense to the user-in-training.

This invention therefore allows for multiple images to be combined in a single set of viewing ports where each image can be selectively displayed or merged depending on the user's needs. In the latter regard, it has another advantage that because of the nature of the synthetic scene being in the electronic domain, the same signals, with appropriate spatial transformations in the accompanying computer apparatus, can be used in driving several displays in the same vehicle at several different periscopic placements and thus permit several users to compare notes and results and communicating alerts about varying quarters of the surrounding area. This is an advantage, as it allows each of several users to prioritize the importance of the various fields of view, according to his/(her) own specific needs, as an individual does not typically address mentally more than one scenario at a time and the one under current consideration may not necessarily be the one currently of primary importance.

In the context of several such separated users, in real wartime scenarios, the advantage just described may be of particular utility and also permits more deliberate concentration on one scene while simultaneously a team-mate can direct his/(her) attention to protecting an unseen segment of the battle scenario. It is therefore obvious that the periscopic optical training implementation should reflect this type of engagement sequence.

It is clear also that given the entirety of a situation and the ability of switching between real and synthetic scenes the system should also provide a subliminal method of distinction between these modes by for example displaying a green rim around a synthetic view and a red rim around the real one, and switching between these (at less than the flicker frequency of the eye/brain) in the cases where the scenes are overlaid to enable their distinction.

The preferred embodiment of this invention is designed to meet the requirements for armored vehicle periscopes. The invention can be applied to other vehicles such as aircraft (especially helicopters), submarines, and spacecraft. Additionally, the invention can be used for heads-up display projectors for periscopic optical training and wartime and other uses where it is beneficial to have an overlaid image.

This non-mechanical method provides the necessary functionality, sturdiness, and robustness for operational conditions of military vehicles, while eliminating potential damage due to excessive handling of a mechanical interface. The invention uses miniature displays or microdisplays to minimize the use of valuable space within the vehicle and reduced power requirements. The invention uses modular optical systems that can accept a wide variety of Commercial Off-The Shelf (COTS) displays instead of relying on a single manufacturer's technology, which permits integration into different periscope stations with little modification.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A periscopic optical training system for displaying within a concealed space simulation and real images of surroundings outside the concealed space, comprising:
   a microprocessor for generating at least one simulation image;
   at least one display for displaying said simulation image;
   at least one periscopic device each with a viewing window for receiving the simulation image and real images; and
   a controller for controlling the simulation image and the real images to be received by said viewing window interchangeably or simultaneously.

2. The periscopic optical training system according to claim 1, wherein said periscopic device includes a liquid crystal light shutter which is transparent in a first state to transmit the real images to be received by the viewing window and is opaque in a second state to block the real images from being received by the viewing window.

3. The periscopic optical training system according to claim 2, wherein the liquid crystal light shutter is a polymer dispersed liquid crystal cell which is controlled by applying a voltage differential across the liquid crystal cell to vary orientation of liquid crystal droplets which are surrounded by a polymer mixture therein thereby changing transmission of the liquid crystal cell.

4. The periscopic optical training system according to claim 2, wherein the periscopic device further includes three wedge-shaped prisms each with at least one right-angled triangular end face and three side faces connecting three sides of the end face, said three side faces including a hypotenuse side face connecting a hypotenuse side of the end face and two edge side faces each connecting one of the two remaining sides of the end face,
   wherein two of the prisms have a hypotenuse side face thereof against each other, and the remaining prism has an edge side face facing toward an edge side face of said two of the prisms,
   wherein the liquid crystal light shutter is placed between the hypotenuse side faces of said two of the prisms or placed between said edge side faces of the prisms.

5. The periscopic optical training system according to claim 4, wherein an airspace or a layer is provided between said edge side faces of the prisms for isolating shock.

6. The periscopic optical training system according to claim 4, wherein the periscopic device further includes a collimating lens placed between the display and an edge side face of one of the prisms.

7. The periscopic optical training system according to claim 6, further comprising an image decoder connected with the microprocessor, and a collimating lens placed between the image decoder and another edge side face of said one of the prisms, wherein an external image passes through the periscopic device to be decoded by the image decoder then processed by the microprocessor to generate said simulation image.

8. The periscopic optical training system according to claim 6, further comprising an image decoder connected with the microprocessor, as well as a central stop, a ball lens, and a field-flattener placed between the image decoder and another edge side face of said one of the prisms, wherein an external image passes through the periscopic device to be decoded by the image decoder then processed by the microprocessor to generate said simulation image.

9. The periscopic optical training system according to claim 4, wherein the periscopic device further includes a central stop, a ball lens, and a field-flattener placed between the display and an edge side face of one of the prisms.

10. The in situ periscopic optical training system according to claim 9, wherein the field-flattener includes at least one fused fiber optic bundle.

11. The periscopic optical training system according to claim 9, wherein an index of refraction of a material of the ball lens is set to form an image near a surface of the ball lens.

12. The periscopic optical training system according to claim 1, wherein the simulation image is generated internally by the microprocessor or imported externally.

13. The periscopic optical training system according to claim 12, wherein the microprocessor extracts salient features of one of the real images to synthesize the simulation image.

14. The periscopic optical training system according to claim 13, wherein when the internally generated simulation image is relayed to the display at a similar scale to said one of the real images and an image quality of the internally generated simulation image is difficult to be discerned from the true image, subliminal color coded cues are added in or added around the display to discern the internally generated simulation image and the true image.

15. The periscopic optical training system according to claim 1, wherein the system includes six displays and six corresponding periscopic devices evenly spaced to face a user so as to provide 360° total coverage of the simulation and real images.

16. The periscopic optical training system according to claim 1, wherein the display is a microdisplay of an organic light emitting diode type, a field emitter type, or a liquid crystals type.

17. The periscopic optical training system according to claim 1, wherein the system is incorporated in an armored vehicle for training the user.

18. The periscopic optical training system according to claim 1, wherein said periscopic device includes optical prisms or optical mirrors which are shock mounted and impervious to environmental attack and military attack.

19. The periscopic optical training system according to claim 1, wherein said periscopic device includes a liquid crystal light shutter which transmits the real images and reflects said simulation image to be received by the viewing window simultaneously.

20. The periscopic optical training system according to claim 1, wherein said periscopic device includes a liquid crystal light shutter which creates a front or rear projection surface such that the simulation image to be received by the viewing window appears at a comfortable viewing distance as the real images.

21. The periscopic optical training system according to claim 1, wherein said periscopic device includes a liquid crystal light shutter which operates on a principle of optical birefringence and is controlled by applying a voltage differential across the liquid crystal shutter to vary the effective index thereof thereby variably changing transmission of the liquid crystal shutter.

* * * * *